J. F. PIERCE.
APPARATUS FOR FORMING TUBES.
APPLICATION FILED MAR. 30, 1917.
1,351,870. Patented Sept. 7, 1920.
6 SHEETS—SHEET 4.
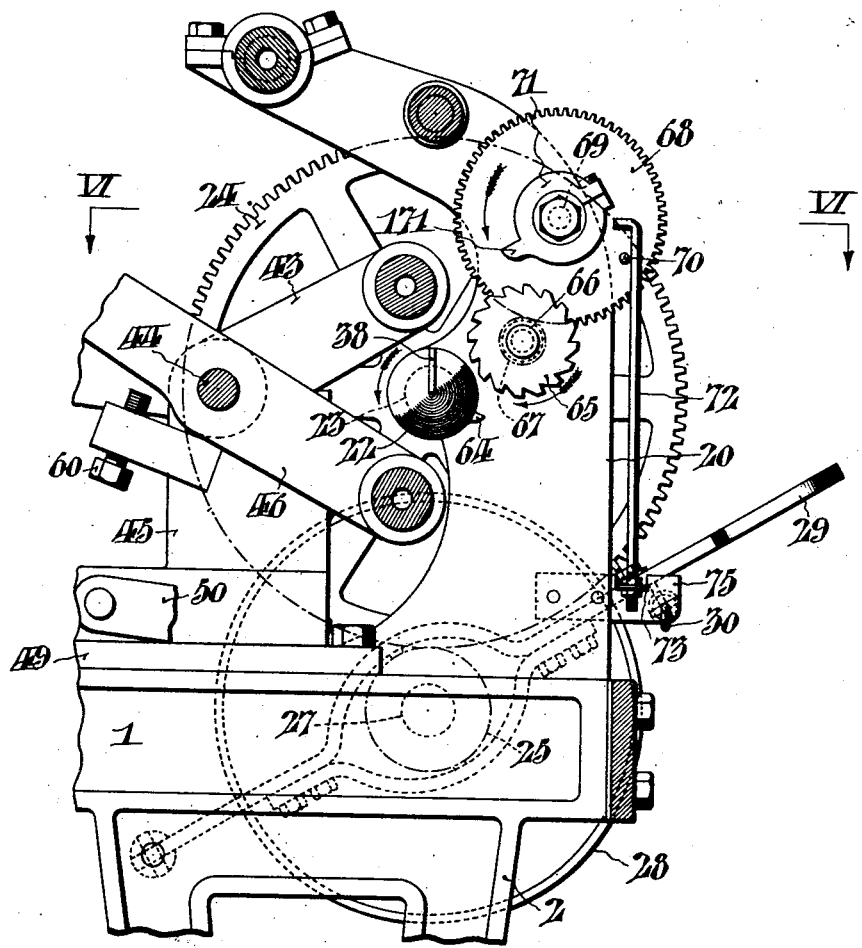
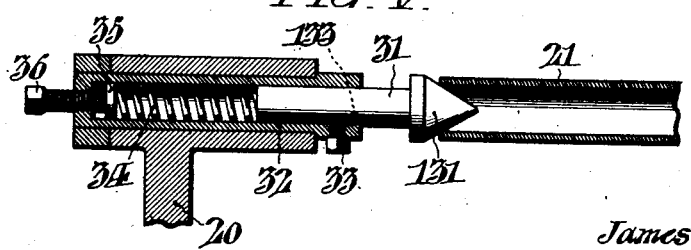

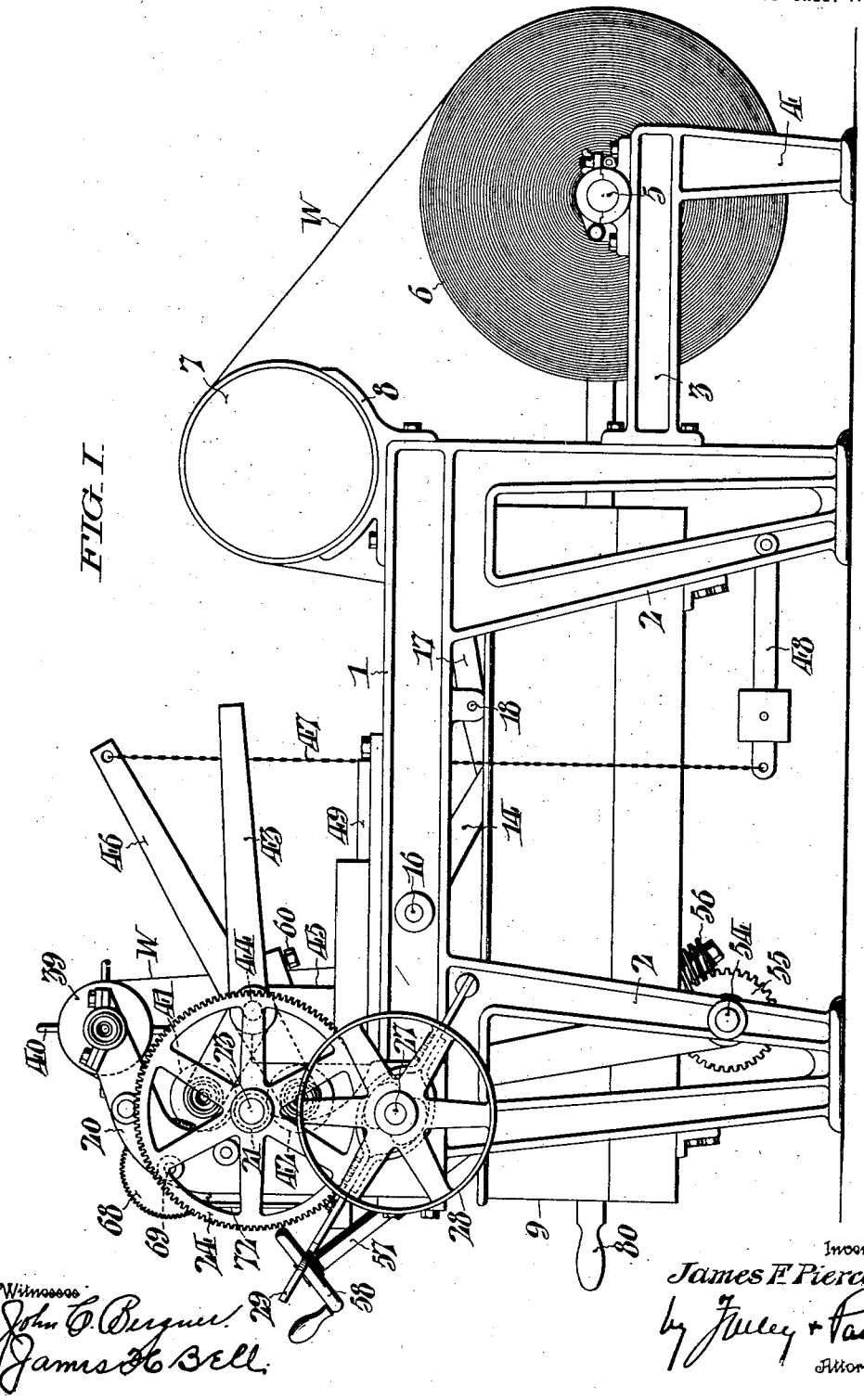

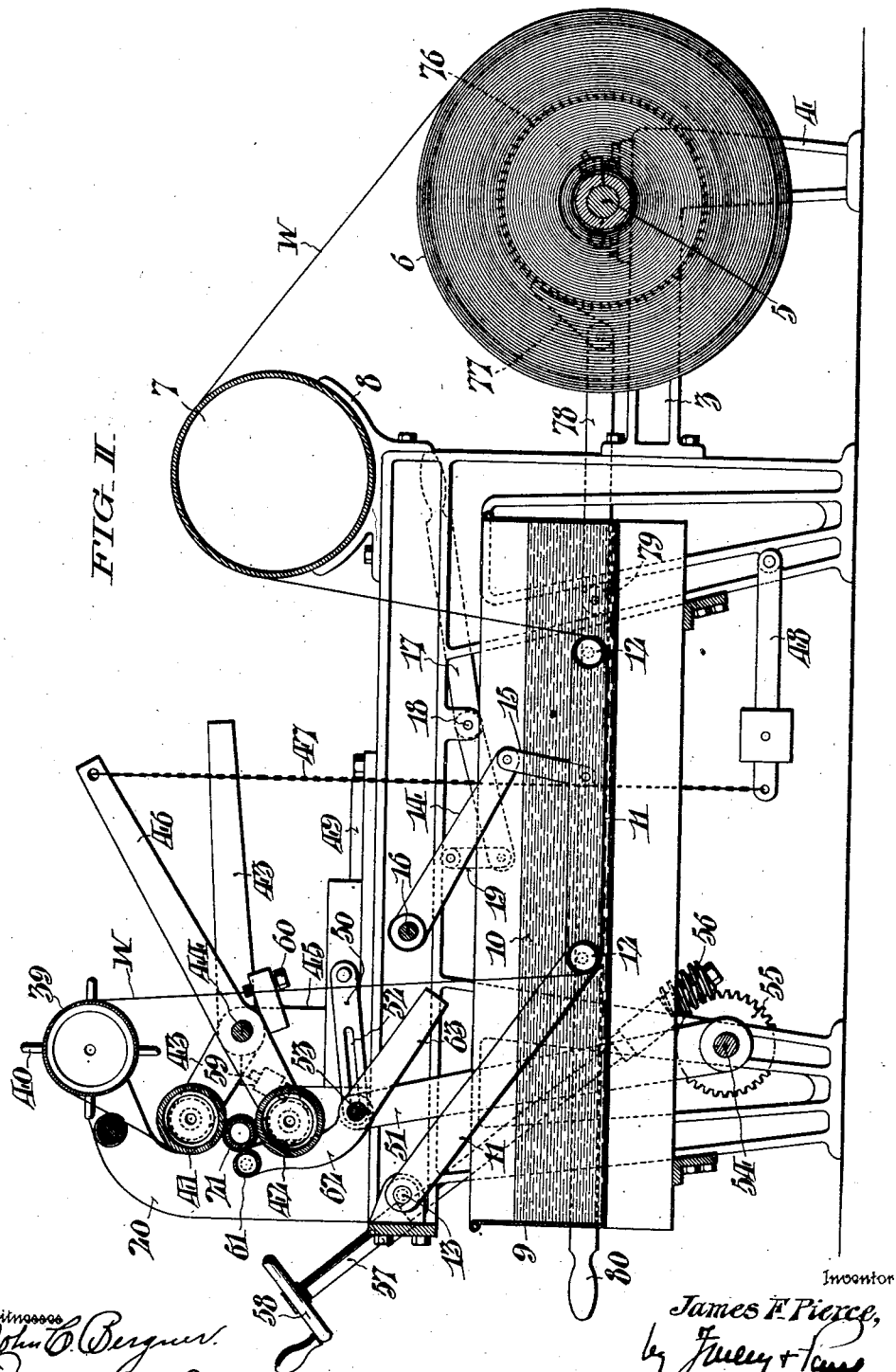

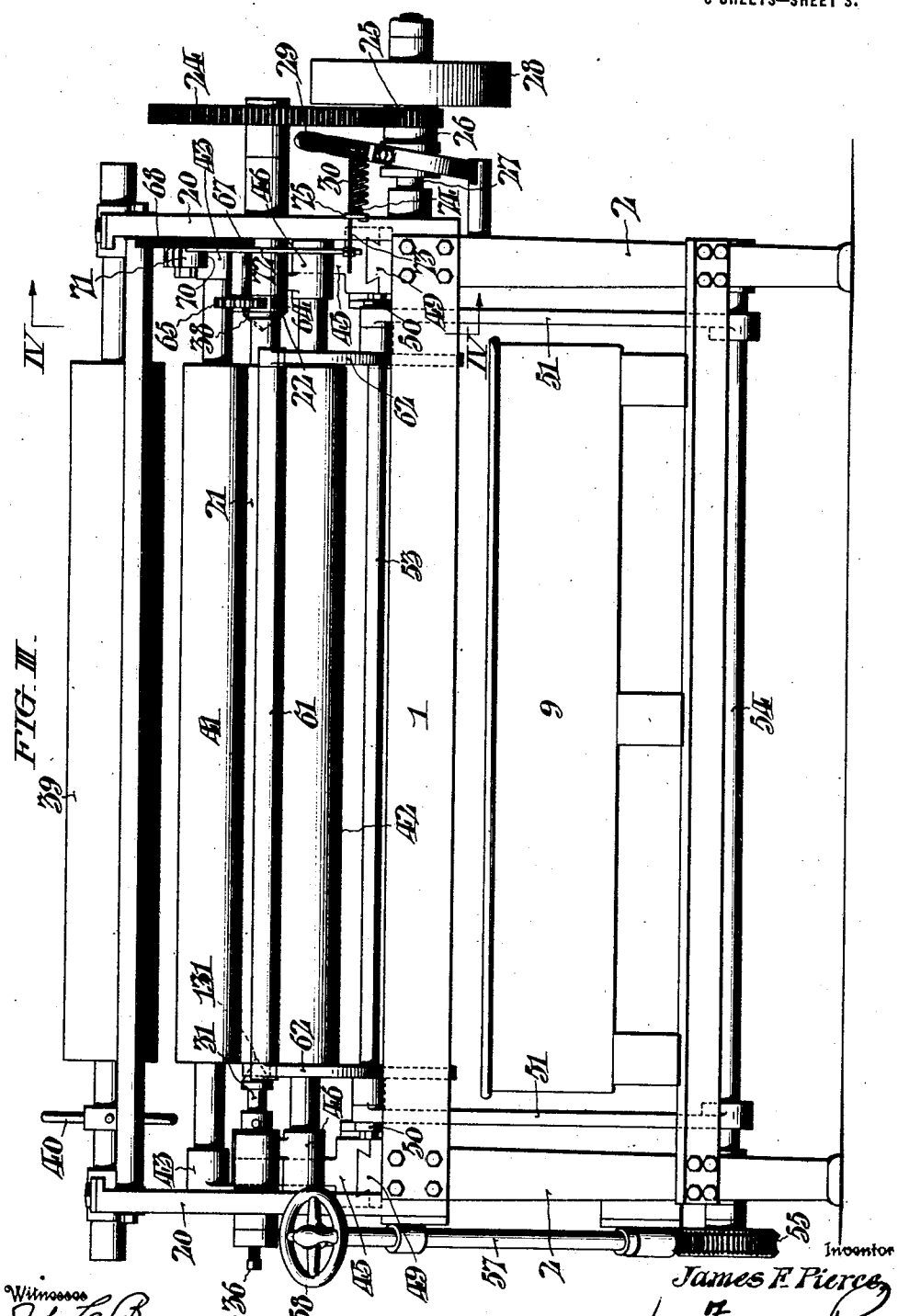

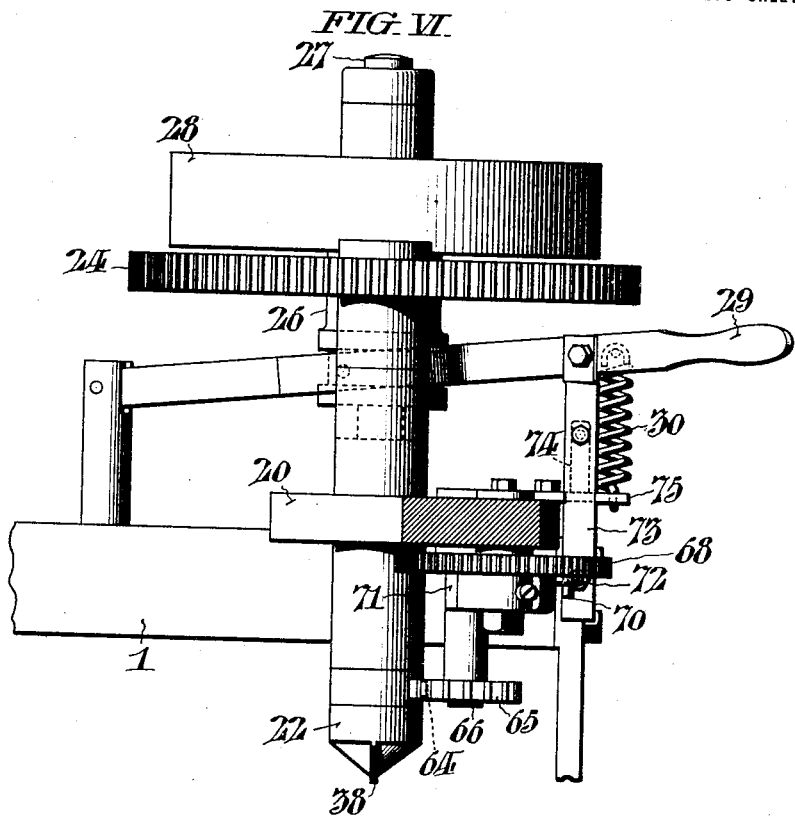

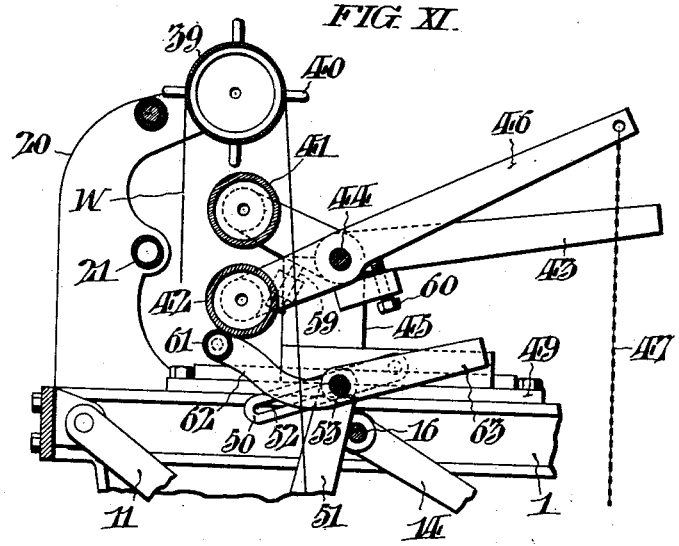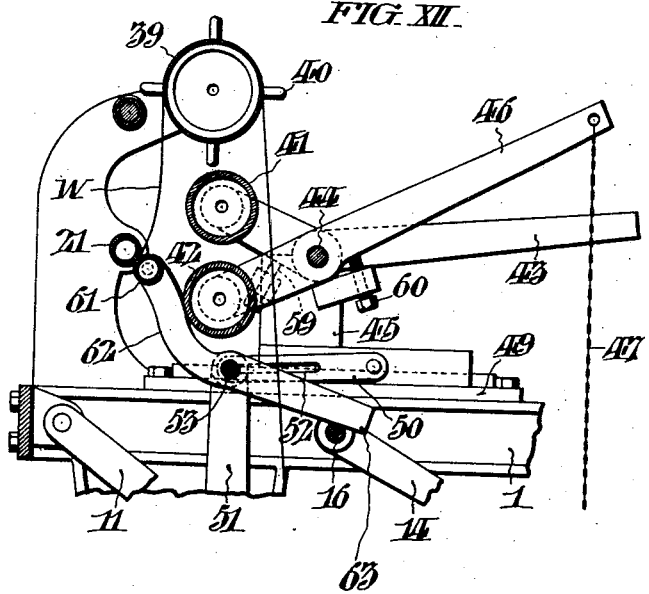

UNITED STATES PATENT OFFICE.

JAMES F. PIERCE, OF GLYNRICH, DELAWARE, ASSIGNOR TO AMERICAN VULCANIZED FIBRE CO., OF WILMINGTON, DELAWARE, A CORPORATION OF DELAWARE.

APPARATUS FOR FORMING TUBES.

1,351,870.     Specification of Letters Patent.    Patented Sept. 7, 1920.

Application filed March 30, 1917. Serial No. 158,769.

*To all whom it may concern:*

Be it known that I, JAMES F. PIERCE, of Glynrich, in the county of New Castle and State of Delaware, have invented certain new and useful Improvements in an Apparatus for Forming Tubes, whereof the following is a specification, reference being had to the accompanying drawings.

The invention relates more particularly to improvements in a machine for forming tubes from a web of fibrous material, such as paper, or the like, which is treated in a suitable bath and subsequently wound on a mandrel to form the tube.

An object of the invention is to provide a machine of the above character wherein the mandrel may be operated by suitable driving mechanism and the web wound on the mandrel by coöperating winding rolls, all of which are readily accessible, so that the machine may be controlled and operated by a single operator.

A further object of the invention is to provide a machine of the above character with winding rolls which coöperate with the mandrel, which winding rolls are so mounted and operated as to facilitate the placing of the web about the mandrel in starting a new tube.

A still further object of the invention is to provide a winding machine of the above character with means for automatically stopping the machine when a predetermined length of web has been wound on the mandrel.

These and other objects will in part be obvious and will in part be hereinafter more fully disclosed.

In the drawings, which show by way of illustration one embodiment of the invention, Figure I, is a side elevation of a machine embodying the improvements.

Fig. II, is a longitudinal sectional view through the machine.

Fig. III, is a front end view of the machine.

Fig. IV, is a detail sectional view taken on line IV—IV in Fig. III, showing more particularly the mandrel, and the automatic stopping mechanism.

Fig. V, is a detail in section, showing the means for supporting one end of the mandrel.

Fig. VI, is a plan sectional view on the line VI—VI of Fig. IV.

Figs. VII and VIII, are respectively a front and side elevation of a modified form of mandrel chuck.

Fig. IX, illustrates a fragmentary view of the end of a hollow type of mandrel constructed according to my invention.

Fig. X, is a similar view of a solid mandrel which may be employed in connection with the chuck illustrated in Figs. VII, and VIII.

Fig. XI, is a partial longitudinal sectional elevation showing the winding rolls as retracted from the mandrel for starting the end of the web upon a blank mandrel in the formation of a new tube, and Fig. XII, is a similar view, but showing the wiper roll moved forward and holding the web so as to insure the proper placing of the web relative to the mandrel and the winding rolls.

The invention consists primarily in a frame which supports a tank containing a treating bath of zinc chlorid or some similarly acting solution through which a web of fibrous material, such as paper is passed, said web being previously led from a supply roll over a heating roll which eliminates any inherent moisture. After this web has been thoroughly impregnated in the bath, it is subsequently presented to a driven mandrel, upon which it is wound to form the tube, proper means being provided for automatically stopping the rotation of the mandrel when a predetermined length of the web has been wound thereon. Associated with the mandrel are winding rolls, and associated with these winding rolls and coöperating therewith in starting the web upon the mandrel is a wiper roll, whose functions are hereinafter described.

Referring more in detail to the drawings, one embodiment of the invention is there shown in a machine having a main supporting frame 1, comprising suitable legs 2—2. Extending from the main frame 1 is an auxiliary frame 3, having supporting legs 4. Journaled in auxiliary frame 3, is shaft 5, upon which is wound the web W of paper or other fibrous material, in the form of a supply roll 6. On being unwound from the supply roll, web W passes over heated drum 7, mounted in suitable brackets 8, carried by the main frame 1. Drum 7, may be heated in any desired way and serves as a means for driving the moisture out of the web prior to its immersion in the treating bath.

Supported by main frame 1, is a tank 9, containing the treating solution, which is indicated at 10. This treating liquor is preferably zinc chlorid, or cotton cellulose, although other solutions may be employed. The web W after passing through this zinc chlorid is thoroughly impregnated with the same, so that when wound into a tube, and heated and rolled, it forms a homogeneous mass, which hardens on drying and results in a seamless cylindrical tube.

To facilitate directing the web through the treating solution, a guide frame 11, is provided, see Fig. II. Frame 11, carries suitable guiding rolls 12, 12, under which web W, is led after passing from drum 7. Frame 11, is pivoted at 13, to the main frame 1, of the machine. Lifting arms 14, are secured to shaft 16, and connected to frame 11, by links 15. Shaft 16, is journaled in main frame 1, and may be oscillated by hand lever 17, which is pivoted at 18, and connected to one of the arms 14, by link 19. This hand lever 17, serves as a means for raising guiding frame 11, to facilitate the threading of the web through the machine, and also permits frame 11, to be lifted from the bath during idle periods of the machine, since the web cannot be left in the treating solution any great length of time without danger of disintegration.

Extending upwardly from main frame 1, are brackets 20, in which are suitable supporting devices for the mandrel upon which the web is to be wound. The mandrel is indicated at 21, and is adapted to be engaged by chuck 22, at one end, see Figs. III, and IV. Chuck 22, is carried by shaft 23, which has gear wheel 24, attached thereto. Gear wheel 24, meshes with pinion 25, on a clutch sleeve 26, which in turn is freely mounted on stud shaft 27. A constantly driven pulley 28, is also loosely mounted on shaft 27, to which pulley sleeve 26, may be clutched under the control of lever 29. A spring 30, connected at one end to lever 29, and at the other end to one of the brackets 20, serves to normally hold the clutch disengaged so that the sleeve 26, is free from the pulley. When, however, this clutch lever 29, is shifted to the right, as viewed in Fig. III, the clutch is closed and gear wheel 24, is driven through the pulley 28.

Mandrel 21, is supported at its other end by center pin 31, which comprises a conical head 131, mounted to centrally engage mandrel 21. This center pin 31, is telescoped within a sleeve 32, so as to move endwise in the sleeve, but is held from rotation therein by stop screw 33, which extends into a longitudinal groove 133, formed in the side face of the shank of pin 31. Located within sleeve 32, is spring 34, which abuts against pin 31, at one end, and against an adjustable abutment 35, at the other end. Abutment 35, is regulated by set screw 36, which passes through the end of sleeve 32, which is in turn mounted in one of the brackets 20.

Mandrel 21, is formed with slots 37, (see Fig. IX) which are adapted to engage a rib 38, on chuck 22. When it is desired to insert the mandrel in the machine, center pin 31, is forced to the left, as viewed in Fig. V, compressing the spring 34, and permitting mandrel 21, to engage chuck 22. Mandrel 21, is then brought into alinement with the center pin 31, after which the center pin is released, so as to engage the end of the mandrel and rotatively support the same.

Web W, after leaving the treating tank is led over a hollow guide roll 39, which is journaled in brackets 20—20, and is so positioned that the web hanging therefrom falls a short distance in the rear of the mandrel 21, see Fig. XI. Hollow roll 39, may be turned by a hand wheel 40, which is secured to the shaft supporting the roll 39. This roll may also be heated by suitable steam connections, so that the web passing over the same is subjected to the desired amount of heat.

Coöperating with mandrel 21, are two winding rolls 41, and 42. Winding roll 41, is journaled in arms 43—43, which are fulcrumed on a rod 44, which is in turn journaled in brackets 45. The winding roll 42, is journaled in similar arms 46, which are also fulcrumed on rod 44. Arms 46, are connected at their outer ends to suitable chains 47, which are in turn connected to weighted levers 48. As viewed in Fig. II, the winding rolls 41, and 42, when in normal position, are adapted to contact with mandrel 21. Roll 41, being above the mandrel presses on the upper face of the same through the action of gravity, while roll 42, is raised through the weighted levers 48, so as to press against the lower face of the mandrel. These rolls 41, and 42, may be heated through suitable steam connections if desired, but are loosely mounted to rotate with the mandrel.

Brackets 45, supporting winding rolls 41, and 42, are mounted to slide in suitable guides 49, and are connected by links 50, to levers 51. Each of links 50, is slotted, as indicated at 52, and these slots receive the ends of cross rod 53, which is adapted to freely slide therein. Levers 51, are united at their upper ends by this cross rod 53, and at their lower ends are rigidly secured upon the shaft 54. This shaft 54, may be rotated by a gear 55, which meshes with a worm 56, carried by inclined shaft 57, which is in turn journaled in suitable bearings in the main frame and rotated by hand wheel 58. Upon the rotation of hand wheel 58, rod 53, moves idly along the slots 52, until the ends of the slots are reached, after which links 50, move in turn, moving the brackets 45. This movement of brackets 45, carries the winding rolls 41, and 42, from the position shown in Fig. II, to the position shown in Fig. XI. When the winding rolls are in this position, they are held separated by adjustable stops 59, and 60. Stops 59, carried by brackets 45, engage arms 43, while stops 60, engage arms 46.

Coöperating with winding rolls 41, and 42, and with mandrel 21, is a wiper roll 61. This wiper roll is carried by arms 62, which are fulcrumed on rod 53, and counterweighted by depending arms 63. Assuming that the parts are in the position shown in Fig. II, the turning of hand wheel 58, in one direction swings arms 62, to the right. As these arms move to the right, wiper roll 61, engages mandrel 21, and winding roll 42, (which is not moved until the rear end of the slot 52, is reached), and causes arms 62, to swing, raising depending extensions 63, above the level of shaft 16. When the end of the slot 52, is reached, brackets 45, slide in guides 49, carrying with them winding rolls 41, and 42, until the position shown in Fig. XI, is finally reached. When the winding rolls are in this position, the mandrel may be readily removed and a new mandrel substituted therefor.

Again, by turning hand wheel 58, in the opposite direction, levers 51, and their cross rod 53, move to the left as viewed in the drawings, carrying with them wiper roll 61. Wiper roll 61, is raised by the depending portions 63, of arms 62, to engage mandrel 21, and clamp the web of paper against the same. A continued movement of the brackets 45, now causes winding rolls 41, and 42, to move forward, and wiper roll 61, moves around the surface of the mandrel, holding the web in a position to insure its being caught between lower winding roll 42, and the mandrel. When the winding rolls are in the extreme forward position, they rest against the mandrel, as also does wiper roll 61. In this position the turning of the mandrel causes the web to be wound and heated and pressed by the said rolls during the formation of the tube.

Chuck 22, is provided with a detent 64, see Fig. VI, which, during each rotation is adapted to engage and move detent wheel 65, one tooth. Detent wheel 65, is carried by a shaft 66, on which is mounted pinion 67, see Fig. IV, which, in turn, meshes with gear 68, secured upon shaft 69. On its face, gear 68, carries a pin 70, and to its hub is adjustably clamped a collar 71, formed with a stop shoulder 171. At the beginning of the winding operation, gear 68, is turned until the stop shoulder 171, rests against the upper end of a rod 72, carried by spring plate 73, attached to clutch lever 29. Spring plate 73, is formed with a stop shoulder 74, which normally rests in rear of plate 75, on the bracket 20.

As mandrel 21, rotates, detent wheel 65, is turned in the direction of the arrow on Fig. IV, and this turns gear wheel 68, in the direction of the arrow indicated thereon. After a certain number of revolutions of the mandrel, the pin 70, engages the hooked end of the rod 72, and raises shoulder 74, from behind plate 75, and permits the spring 30, to shift the clutch members to stop the machine.

By shifting collar 71, its stop shoulder 171, may be adjusted at various angular distances from pin 70, on gear 68, so that the stop mechanism may be set to become effective to stop the machine for any predetermined number of revolutions of the mandrel.

Shaft 5, carrying the supply roll web is provided with a ratchet wheel, indicated at 76, in dotted lines in Fig. II. Pawl 77 engages this ratchet wheel, and is connected to a lever 78, fulcrumed at 79, to the main frame. Lever 78, is provided with handle 80, which is accessible to the operator, and by means of this lever the supply roll may be turned to facilitate the starting of the web on the mandrel.

In Figs. VII, and VIII, I have illustrated a modified form of chuck 90, which may be employed in connection with either the hollow type mandrel shown in Fig. IX, or the solid type shown in Fig. X. The solid mandrel is also slotted for a purpose which has already been explained.

The modified chuck 90, is provided with a conical cavity 91, having engaging ribs 92—92, its functions being identical in other respects to that described in connection with the chuck 22.

In the operation of the machine, the web is led through the bath and over roll 39, and started on the mandrel. The wetness of the web as it comes from the bath is sufficient to make it cling to the roller 39, preventing the short end of the web from leaving its position on the mandrel. The operator then shifts the clutch lever 29, thus causing the rotation of the mandrel and winding of the web thereon, with rolls 41, and 42, pressing and heating the web as it is wound. After a predetermined number of revolutions of the mandrel, the machine is automatically stopped.

The web is then severed directly above the mandrel which is subsequently removed and a new mandrel substituted. By means of lever 78, which operates on shaft 5, sufficient slack may be given to the web to allow it to be drawn forward, through the manual operation of the guide roll 39, until the severed end reaches the position shown in Fig. XI, whereupon it is started on a new roll as already explained.

It will be obvious from the above description that the clutch lever, also the operating lever for the supply roll, and the hand controlled shaft for withdrawing the winding rolls, are all accessible to the operator, who stands at the front of the machine. I have thus provided a machine which may be readily controlled by one operator.

It is also obvious that minor changes in the details of construction and the arrangement of parts may be made without departing from the spirit of the invention, as set forth in the appended claims.

Having thus described my invention, I claim:

1. In an apparatus for forming tubes, the combination of means for supplying a web of material; a treating bath; means for directing the web through the treating bath; a mandrel upon which the web is wound to form a tube; means for starting the web on the mandrel; means for rotating the mandrel; yielding rolls coöperating with the mandrel mounted above and below the same for winding the web thereon; and means for stopping the operation of the machine when a predetermined length of web has been wound upon the mandrel.

2. In an apparatus for forming tubes, the combination of means for supplying a web of material; a mandrel; means for guiding the web to the mandrel; a pair of yielding rolls coöperating with said mandrel for winding the web thereon; and means for simultaneously moving said rolls into and out of position for coöperating with the mandrel.

3. In an apparatus for forming tubes, the combination of means for supplying a web of material; a mandrel; means for guiding the web to the mandrel; means for rotating the mandrel, whereby the web is wound thereon; sliding brackets; yielding rolls mounted thereon adapted to coöperate with the mandrel for winding the web thereon; and means for moving the brackets, whereby the rolls are simultaneously moved into and out of position to coöperate with the mandrel.

4. In an apparatus for forming tubes, the combination of means for supplying a web of material; a mandrel; means for guiding the web to the mandrel; means for rotating the mandrel, whereby the web is wound thereon; a roll adapted to coöperate with the mandrel and when in operative position pressed by gravity against the mandrel; a second roll adapted to coöperate with the mandrel and when in operative position pressed against the face thereof by a weighted lever; and means for simultaneously withdrawing the rolls out of operative position with the mandrel.

5. In an apparatus for forming tubes, the combination of means for supplying a web of material; a mandrel; means for guiding the web to the mandrel; means for rotating the mandrel, whereby the web is wound thereon; a roll adapted to coöperate with the mandrel and when in operative position pressed by gravity against the mandrel; a second roll adapted to coöperate with the mandrel and when in operative position pressed against the face thereof by a weighted lever; means for simultaneously withdrawing the rolls out of operative position with the mandrel; and stops for supporting the rolls when withdrawn from operative position with the mandrel.

6. In an apparatus for forming tubes, the combination of means for supplying a web of material; a mandrel; means for guiding the web to the mandrel; means for rotating the mandrel, whereby the web is wound thereon; rolls coöperating with the mandrel for winding the web thereon; and a wiper roll coöperating with said first mentioned rolls in positioning the web relative to the mandrel for starting the tube.

7. In an apparatus for forming tubes, the combination of means for supplying a web of material; a mandrel; means for guiding the web to the mandrel; means for rotating the mandrel, whereby the web is wound thereon; a pair of rolls coöperating with the mandrel for winding the web thereon; a wiper roll coöperating with said pair of rolls in positioning the web relative to the mandrel for starting the tube; and a single means for moving said pair of rolls and said wiper roll out of contact with the mandrel.

8. In an apparatus for forming tubes, the combination of means for supplying a web of material; a mandrel; means for guiding the web to the mandrel; means for rotating the mandrel, whereby the web is wound thereon; a pair of rolls coöperating with the mandrel for winding the web thereon; a wiper roll coöperating with said pair of rolls in positioning the web relative to the mandrel for starting the tube; means for moving said pair of rolls and said wiper roll out of contact with the mandrel, said means being arranged to move the wiper roll out of contact with the mandrel before the pair of rolls is moved out of contact with the mandrel.

9. In an apparatus for forming tubes, the combination of means for supplying a web of material; a mandrel; means for guiding the web to the mandrel; means for rotating the mandrel; sliding brackets; a pair of rolls mounted thereon adapted to coöperate with the mandrel for winding the web thereon; a lever for moving the brackets, whereby the rolls are moved into and out of contact with the mandrel, said lever having a sliding connection with said brackets.

10. In an apparatus for forming tubes, the combination of means for supplying a web of material; a mandrel; means for guiding the web to the mandrel; means for rotating the mandrel; sliding brackets; a pair of rolls mounted thereon adapted to coöperate with the mandrel for winding the web thereon; levers for moving the brackets, whereby the rolls are moved into and out of contact with the mandrel; a wiper roll adapted to contact with said mandrel and pivoted to said levers, said levers having a sliding connection with said brackets, whereby said wiper roll is moved out of contact with said mandrel before said first mentioned rolls are moved out of contact with the mandrel.

11. In an apparatus for forming tubes, the combination of means for supplying a web of material; a mandrel; means for guiding the web to the mandrel; means for rotating said mandrel; sliding brackets; a pair of rolls mounted thereon adapted to coöperate with the mandrel for winding the web thereon; levers for moving the brackets, whereby the rolls are moved into and out of contact with the mandrel; a wiper roll adapted to contact with said mandrel and pivoted to said levers; links connecting said levers to said brackets having a slot therein, whereby said wiper roll is moved out of contact with said mandrel before said first mentioned rolls are moved out of contact with the mandrel.

12. In an apparatus for forming tubes, the combination of means for supplying a web of material; a mandrel; means for guiding the web to the mandrel; means for rotating the mandrel; a clutch controlling said means; and means connected with said clutch for automatically stopping the rotation of said mandrel when a predetermined amount of the web has been wound on the mandrel, including a bar connected to said clutch; a gear; a pin mounted on said gear adapted to contact with said bar once in each revolution of said gear, whereby said clutch is thrown out and the rotation of the mandrel stopped.

13. In an apparatus for forming tubes, the combination of means for supplying a web of material; a mandrel; means for guiding the web to the mandrel; means for rotating the mandrel; a clutch controlling said means; and means connected with said clutch for automatically stopping the rotation of said mandrel, including a detent turning with said mandrel; a toothed wheel coöperating therewith and adapted to be moved one tooth for each rotation of the mandrel and connections between said toothed wheel and said clutch, whereby said clutch is thrown out and the rotation of the mandrel stopped after the toothed wheel has been rotated a predetermined amount.

14. In an apparatus for forming tubes, the combination of means for supplying a web of material; a mandrel; means for guiding the web to the mandrel; means for rotating said mandrel; a pair of rolls adapted to coöperate with said mandrel for winding said web thereon; means for moving said rolls into and out of contact with said mandrel; a lever controlling said means; a lever coöperating with said first means for supplying a web of material, whereby the feeding of the web may be facilitated on starting the machine, said levers being mounted in proximity, whereby the machine may be operated by a single operator.

15. In an apparatus for forming tubes, the combination of means for supplying a web of material; a mandrel for forming the web into tubes; a guide roll for guiding said web to said mandrel; a wheel mounted on said guide roll and coöperating therewith to facilitate feeding the web to the mandrel on starting the machine; a pair of rolls adapted to coöperate with said mandrel for winding said web thereon; means for moving said rolls into and out of contact with said mandrel; a lever controlling said means; a lever coöperating with said first means for supplying a web of material, whereby the feeding of the web may be facilitated on starting the machine, said levers and said wheel being mounted in proximity, whereby the machine may be operated by a single operator.

16. In an apparatus for forming tubes, the combination of a mandrel, means for feeding a web of material thereto, means for starting the web on the mandrel, means coöperating with the mandrel for winding the web thereon, and means whereby the web starting means first engages the web on the mandrel to clamp the same thereagainst and is then moved circumferentially of the mandrel to hold the web in position until engaged by the web winding means.

17. In an apparatus for forming tubes, the combination of a mandrel having a fixed axis, means for feeding a web of material thereto, web winding means movable toward and from said mandrel, means for holding the web thereagainst, and means movable toward and from the mandrel for moving said holding means toward and circumferentially of said mandrel while in contact with the web in advance of the forward movement of said web winding means.

18. In an apparatus for forming tubes, the combination of a mandrel having a fixed axis, means for feeding a web of material thereto, means for holding the web against the mandrel, web winding means adapted to move toward said mandrel to engage the web on the mandrel, and means whereby the web holding means moves circumferentially of the mandrel and in contact with the web thereon to insure the web being caught between the mandrel and the web winding means.

In testimony whereof, I have hereunto signed my name at Philadelphia, Pennsylvania, this nineteenth day of March, 1917.

JAMES F. PIERCE.

Witnesses:
 WILLIAM EVES, 3rd,
 JAMES H. BELL.